United States Patent [19]

Garrison et al.

[11] 4,175,075

[45] Nov. 20, 1979

[54] ISOLATION OF PROTEIN FROM VEGETABLE SEEDS

[75] Inventors: Charles M. Garrison, Fairfield; Rudolph W. Youngquist; Harry M. Taylor, both of Cincinnati, all of Ohio

[73] Assignee: The Procter & Gamble Company, Cincinnati, Ohio

[21] Appl. No.: 922,919

[22] Filed: Jul. 7, 1978

[51] Int. Cl.$^2$ .............................................. A23J 1/14
[52] U.S. Cl. ................................. 260/123.5; 426/656
[58] Field of Search .......................... 260/123.5, 112 R

[56] References Cited

U.S. PATENT DOCUMENTS

| | | | |
|---|---|---|---|
| 2,495,706 | 1/1950 | DeVoss et al. | 260/123.5 X |
| 2,635,094 | 4/1953 | Belter et al. | 260/123.5 |
| 3,268,503 | 8/1966 | Mustakas et al. | 260/123.5 |
| 3,365,440 | 1/1968 | Circle et al. | 260/123.5 |
| 3,734,901 | 5/1973 | Hayes et al. | 260/123.5 |
| 3,762,929 | 10/1973 | DeLapp | 260/123.5 X |

OTHER PUBLICATIONS

Plant + Cell Physiol 16: 933–937, (1975), Mikola et al.
Arch. of Biochem. and Biophysics, 95, pp. 402–404, (1961), Altischul et al.
Plant Physiology, vol. 42, 1967, Tombs, pp. 797–813.

*Primary Examiner*—Howard E. Schan
*Attorney, Agent, or Firm*—Walter L. Stumpf; Jerry J. Yetter; Richard C. Witte

[57] ABSTRACT

A density fractionation process for recovering vegetable seed protein granules from the remaining portion of the vegetable seeds, said seeds having a lipid concentration of from 10% to about 70%, using a ternary, single-phase solution of water, an electrolyte, and a carbohydrate, said solution having a density of from about 1.1 to about 1.5 g/ml and a water activity of less than about 0.90.

19 Claims, 1 Drawing Figure

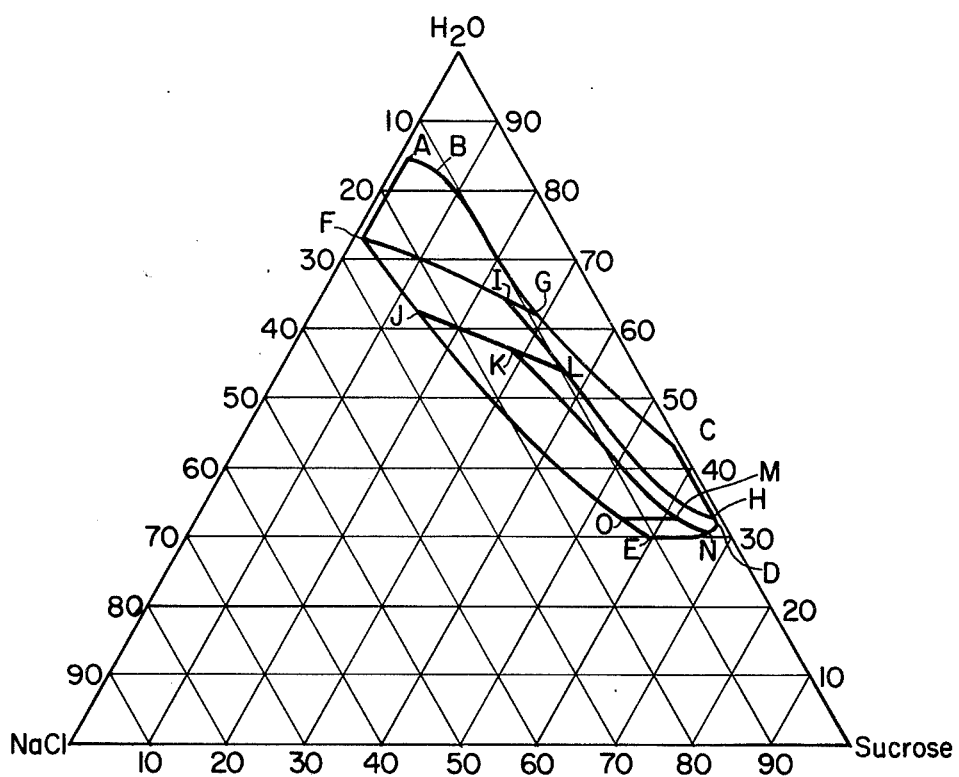

ISOLATION OF PROTEIN FROM VEGETABLE SEEDS

TECHNICAL FIELD

Many types of vegetable seeds contain protein of sufficient quality and concentration to be nutritionally useful for humans. Unfortunately, because the protein of the vegetable seeds is often in a form unacceptable to human tastes, the valuable protein material is not conveniently used. Soybean seeds, for example, have high concentrations of protein, and a high protein efficiency ratio, but they also have seed flavor notes which are unacceptable to many humans and other seed materials which tend to induce flatulence. It can be appreciated that there is a continuing need for commercially feasible processes to separate the edible protein present in vegetable seeds from the undesirable and inedible materials. Successful protein separation techniques allow direct human consumption of vegetable protein found in previously inedible or unpalatable sources, such as in oleaginous seeds such as soybean and cottonseed.

The walls and cells of desirable seed sources of vegetable protein consist primarily of lipid, insoluble cellulosic materials, soluble carbohydrates, etc. The majority of the protein in such vegetable seeds is in the form of discrete bodies or protein granules. Accordingly, the protein granules must be released from the balance of the seed structure to be used, for example, in the manufacture of vegetable-based meat analog products, and the like, to avoid the aforementioned problems.

The protein of vegetable seeds, especially oleaginous seeds such as soybeans, peanuts, sunflower seeds, and cottonseeds, is usually obtained in the form of isolate or concentrate by the extraction of the defatted seeds. The vegetable seeds are first comminuted or ground to form flakes, meals, or flours which are either extracted with a solvent, e.g., hexane, or pressed to remove the oil and lipid materials. The defatted mass can be washed with a water-alcohol solution to dissolve and remove soluble, residual cellular materials and yield a concentrate. Concentrates, however, generally have low protein contents.

Traditional protein extraction processes for producing isolates from the defatted mass use water or aqueous alkaline solutions to solubilize the protein. The solubilized protein can then be removed from the insoluble seed materials, and precipitated and recovered by various means; isoelectric precipitation and filtration, for example.

There are many inherent disadvantages in the art-disclosed protein extraction procedures. The tendency towards denaturation of the protein by excessive heat or harsh pH's detrimentally affects the physical and chemical characteristics of the protein. Denatured proteins are difficult to use in some commercial applications. Some separation methods use flammable solvent systems. Still other methods use halogenated organic compounds, which may be undesirable where the ultimate product is to be consumed by humans.

As noted, many types of vegetable seeds, especially oleaginous seeds such as soybeans and cottonseeds, contain their protein in the form of discrete particles. The present invention provides a means for safely and conveniently separating such protein particles from lipid containing vegetable seed mixtures by means of a density fractionation process; an initial lipid extraction step is unnecessary. In this process, a toxicologically-accepted ternary solvent system comprising water, a carbohydrate (e.g. sucrose) and an electrolyte, (e.g. sodium or potassium chloride) is used to separate the protein particles from the other cellular components.

BACKGROUND ART

Claim 1 of U.S. Pat. No. 4,089,848, Bell, et al., May 16, 1978, discloses a method for separating protein from de-oiled oats. The claimed process involves dissolving oats in alkaline solution, acidifying to separate acid soluble impurities, and then recovering acid soluble protein.

U.S. Pat. No. 3,794,735, Newsom, et al., Feb. 26, 1974 discloses a method for isolating protein from protein bearing seeds without removing the lipid (defatting). An aqueous emulsion of protein and water is formed and centrifuged to remove cellulosic materials. The protein is recovered by isoelectric precipitation.

M. P. Tombs, *Plant Physiology*, 42, 797 (1967) describes a method of isolating protein bodies from hexane extracted (defatted) soy meal by density gradient centrifugation using a 70% to 90% (wt/vol) aqueous sucrose solution having a density from 1.25 to about 1.34. The reference also describes the swelling and bursting of protein bodies when the meal is placed in contact with water, a problem which is said to be solved by buffering at pH 5.

Certain other density fractionation processes for separating protein from other cellular materials are known. U.S. Pat. No. 3,828,017, Finley, et al. (1974) discloses the centrifugation of a slurry of pulverized soy material and liquid fluorocarbon having a density of 1.35 to 1.45.

Traditional methods for isolating protein have involved extraction with mixtures of polar and nonpolar solvents and dissolution with reprecipitation of protein. U.S. Pat. No. 2,278,670, Rauer, Apr. 7, 1942, discloses a two-step process for recovering protein using organic solvents and alkali.

U.S. Pat. No. 3,043,826, Beaber, et al., July 10, 1962 discloses the extraction of protein from alcohol-treated de-oiled soybean material by contact with water at alkaline or acidic pH's and with subsequent recovery by precipitation.

Japanese Pat. No. 2,130,942, Ajinomoto, Apr. 22, 1976 (abstract) discloses the separation of protein material by its isoelectric precipitation from an aqueous slurry.

Other separation procedures are also known. U.S. Pat. No. 3,734,901, Hayes, et al., May 22, 1973 discloses a protein concentration step in which nonproteinaceous materials are separated from vegetable seed material using a monohydric alcohol/water extraction medium. U.S. Pat. No. 3,649,293, Hoer, et al., Mar. 14, 1972 teaches the separation of protein by solubilizing the protein from defatted soy material, depositing the protein on solid cellular material, and separating the protein-carrying solids which are then processed further.

BRIEF DESCRIPTION OF THE DRAWINGS

The FIGURE illustrates a phase diagram of the preferred water/carbohydrate/electrolyte system in which the carbohydrate is sucrose and the electrolyte is sodium chloride.

The area enclosed by ABCDEF defines the concentrations of the components used in the solutions in the manner of claim 1. Line AB represents the boundary where the density is 1.10; Line BC represents the boundary where the water activity ($a_w$) is 0.90; Line CD represents the boundary where the concentration of sodium chloride is 1%; Line DEF represents the phase boundary between the ternary monophase solution used in this invention and the various multiphase systems which can be formed with water, sucrose, and sodium chloride; and Line FA represents the boundary where the concentration of sucrose is 1%. The area bounded by ABCDEF describes a solution having a density of from about 1.1 to 1.5 and a water activity of less than about 0.9.

The area bounded by GCDEF defines the solution used in the manner of claim 2. The boundary of FG corresponds to a density of 1.20.

The area bounded by FIHDE defines the preferred solution of claim 3. The boundary IH corresponds to a water activity of 0.85.

The area bounded by JLHDE defines the solution of claim 4. The boundary JL corresponds to a density of 1.25.

The area bounded by JKNE defines the solution used in the manner of claim 5. The Line JK represents a density of 1.25; Line KN represents a water activity of 0.8; and Line NEJ represents the phase boundary of the solution. The more preferred compositions of the area bounded by JKNE have densities of from about 1.25 to about 1.50 and water activities of 0.5 to about 0.8.

The area bounded by JKMO defines the solution of claim 6 which is the most preferred solution. For water/sucrose/sodium chloride solutions, Line JK represents a density of 1.25; Line KM represents a water activity of 0.8; Line MO represents the boundary where the solution viscosity is 300 cp; and Line OJ defines the phase boundary. The area bounded by JKMO defines a solution having a density of from about 1.25 to about 1.50, a water activity of from 0.5 to 0.8, and a viscosity of from about 1 centipoise (cp) to about 300 cp.

DISCLOSURE OF THE INVENTION

The present invention encompasses a process for recovering vegetable seed protein granules from vegetable seed material, comprising suspending comminuted vegetable seed material having from 10% to about 70% lipid in an aqueous solution comprising an electrolyte, at a concentration greater than about 1%, and a carbohydrate, at a concentration greater than about 1%, said aqueous solution having a density of from about 1.1 to about 1.5, and a water activity of less than about 0.90, and, isolating the vegetable seed protein granules from the balance of the vegetable seed material.

The present application also encompasses a process for recovering vegetable seed protein granules from vegetable seed material having from 10% to about 70% lipid, comprising:

(1) comminuting said vegetable seed material;
(2) suspending said vegetable seed material in an aqueous solution comprising an electrolyte, at a concentration greater than about 1%, and a carbohydrate, at a concentration greater than about 1%, said solution having a density of from about 1.1 to about 1.5, and a water activity of less than about 0.90;
(3) isolating the vegetable seed protein granules from the balance of the vegetable seed materials;
(4) defatting the vegetable seed protein granules; and
(5) washing the vegetable seed protein granules with a water/alcohol solvent mixture to selectively extract non-proteinaceous components from the protein granules.

The present invention takes advantage of the fact that the difference in density between the protein granules and the residual cellular material of comminuted vegetable seed material can be used as a basis for a density fractionation process. Through the careful control of density, water activity and viscosity of the ternary water/carbohydrate/electrolyte solution, separations can be made with ease, and without hydrating and adversely denaturing the protein granules or proteins contained therein. By using comminuted vegetable seed materials having 10% to 70% of natural or added lipid, the density fractionation process can be performed at lower solution densities and higher water activities than where low lipid materials are used. The lipid appears to stabilize the protein granules so high yields are still obtained within the specified $a_w$ range. The product is a vegetable protein having superior physical characteristics for commercial formulation as well as superior flavor and protein quality.

By "vegetable seed protein granules" and "protein granules" as used herein is meant aleurone grains or protein bodies. Aleurone grains and protein bodies are granules of reserve or storage protein and are typically found in the seeds of many species of plants. Such reserve or storage proteins differ in their physical and chemical properties from proteins typically found in generalized cell protoplasm. They are subcellar granules or organelles and contain most of the protein material, for example, in soybeans. Protein bodies and aleurone granules range in diameter from the 0.1$\mu$ in the high lysine corn mutant "opaque-2", to about 20$\mu$ in soybeans; a more typical size range is from 2 to 8$\mu$.

By "vegetable seed material" as used herein is meant plant seeds which contain protein granules. Although many protein granule containing materials have lipid contents below 10%, such materials can be used in the present invention through the addition of vegetable lipids up to a level of about 10% to about 70%. Among the vegetable seed materials known to contain protein granules are cereal grains including rice, oats, barley, millet, corn, grain sorghum, and immature wheat (in mature wheat the granules fuse together). Other vegetable seed materials include various non-oleaginous legumes such as peas, broad beans, jack beans, lima beans, mung beans, and lentils, all of which are reported as having protein granules.

The preferred class of vegetable seed materials encompasses the "oleaginous seeds". By "oleaginous seeds" is meant such oil- and protein granule-containing seeds as cottonseeds, soybeans, peanuts, rapeseed, copra, sunflower seeds, and the like. The most preferred vegetable seed material is the seed of the soybean.

By "lipid" as used herein is meant the oils naturally present in vegetable seed materials and especially the oil in oleaginous seeds. Added lipid is preferably oleaginous seed oil recovered during defatting processes.

By "having from 10% to about 70% lipid" is meant that lipid is naturally present in the vegetable seed material at a level of from 10% to about 70% or, that if the vegetable seed material contains less than about 10% lipid, the amount of lipid present has been increased by the addition of lipid. Lipid can also be added to supplement the natural lipid of the seed materials. The oleaginous seeds, for example, can be comminuted without their oil having been extracted or with extra lipid added; or they can be defatted for convenience in handling, especially in grinding or milling, and the lipid can then be readded after grinding. Preferred for use herein are such oleaginous seed materials as soy or cottonseed meals, soy or cottonseed flours, or soy or cottonseed concentrates.

By "electrolyte" as used herein is meant a chemical substance which ionizes in the presence of water to form cations and anions and which will provide ionic conductivity when dissolved in water. Electrolytes which can be used herein are alkali metal halides and alkali metal phosphates; examples include lithium chloride and potassium and sodium dihydrogen phosphate. Sodium chloride and potassium chloride are highly preferred electrolytes, and potassium chloride is particularly preferred if a low sodium protein product is desired.

The term "carbohydrate" is used herein in its usual context to mean a water-soluble saccharidic compound of carbon, hydrogen, and oxygen that contains the saccharose grouping. Monosaccharides, disaccharides, and low molecular weight polysaccharides are preferred types of carbohydrates suitable for use herein.

Monosaccharides useful herein include simple sugars such as fructose and glucose. Disaccharides include such compounds as sucrose, maltose, and lactose.

The carbohydrates used herein can be either purified or unrefined. For example, corn syrup, a mixture of glucose, maltose, and maltodextrine, can be used as the carbohydrate component. Highly preferred carbohydrates are the nonreducing disaccharides, in particular sucrose. Other carbohydrates which can be used herein include fructose, glucose, raffinose, stachyose, corn syrup solids, low molecular weight dextrans, and soluble plant sugars.

The term "water activity" ($a_w$) is used herein in its usual context to mean the ratio of the fugacity of water in a solution (f) to that of pure water ($f_o$) at the same temperature. The water activity of a solution can be conveniently measured on a Sina Hygrometer, Type SMT-B, which provides a direct determination of $a_w$. The water activity of an ideal solution is 0.9823 for a 0.1 molal solution. Non-electrolytes depart from ideal behavior only slightly at low concentrations. As the concentration of an electrolyte in solution increases, the solution's deviation from ideal behavior increases greatly.

By "isolating" as used herein is meant a separation procedure by which the protein granules can be separated from the residual vegetable seed material. This separation is usually accomplished using centrifugation, to perform a density fractionation, followed by a physical separation and removal of the protein granule-containing layer from the remainder of the density fractionated mixture, by decantation for example. The isolation step can be performed using high or low centrifuge velocities and can even be accomplished by letting the suspension of comminuted seed material fractionate by the force of gravity. Centrifugation is the preferred mode for density fractionation and useful centrifuge forces for this purpose are typically in the range of 1,700 g to 17,000 g.

By "defatting" as used herein is meant any procedure by which the protein granule-containing layer of the density fractionation solution is treated to remove the lipid from the protein granules. Typical methods include solvent extraction, for example, with hexane, and filtration.

By "comprising" as used herein is meant that other materials may be present in the ternary solution and other processing steps can take place so long as they do not adversely affect either the vegetable material or the physical-chemical characteristics of the aqueous solution used for the density fractionation. Thus, the term "comprising" encompasses the more restrictive terms "consisting essentially of" and "consisting of".

Composition percentages used herein are weight/weight.

To achieve an efficient separation of the protein granules from the other components of the vegetable seed material during the density fractionation process, the vegetable seed material must be finely ground or comminuted. The grinding or comminution frees as many of the protein granules as possible from the cellular structure of the seed. The vegetable seed material can be comminuted before the separation step, defatted, ground, and relipidized before being subjected to the separation process or it can be comminuted and lipidized before the separation step.

If it is desirable to defat the seed material before processing, any conventional method of defatting seeds can be used. In most conventional seed defatting processes, the seeds, typically the oleaginous seeds, are first roll milled or comminuted to form thin flakes or meal. The flakes or meal are then either pressed to remove the oil and lipid materials or extracted with a solvent such as hexane. The lipid is then readded to produce fatted seed flakes, meals, or flours which are then used in the instant process.

Any conventional mode of grinding can be used to reduce the particle size of the vegetable material. Exemplary comminution methods include jet milling, pin milling, hammer milling, ball milling, or vibrational energy milling. Jet milling is especially effective in reducing the size of the seed particles.

Where oleaginous seeds are used, the seeds can be effectively ground by freezing the seeds and comminuting them with a hammer mill. An alternative, but less efficient method, is to use a colloid mill and extra, added lipid.

The particle size of the comminuted seed material should be in the range of about 20 to about 150 microns. If the seed materials are ground too fine, the protein granules themselves will be ruptured with the result being a loss in yield of the protein ultimately recovered. Preferably, at least 90% (by weight) of the seed material will be less than 80 microns to promote an efficient separation and release of the protein granules from other cellular material.

In the preferred method of this invention, soybean flakes, meal or concentrate, with a lipid content of 10% to about 70%, are milled to a particle size of about 30 to about 80 microns.

The lipid-containing comminuted seed material is added to a bath comprising the aqueous carbohydrate/electrolyte fractionation solution of specified density and $a_w$. The carbohydrate is the major element in controlling the density of the solution. The density range for the fractionation solutions for the present invention is from 1.10 to 1.50 grams/ml. When operating in this range, the protein is more easily separated from the aqueous solution and more completely separated from the more dense, insoluble residual vegetable seed materials, such as cellulose and other insoluble carbohydrate materials, present in the starting lipid-containing vegetable material. The separations are more efficient in the preferred density range of about 1.2 to about 1.5 and are yet more efficient in the more preferred density range of about 1.25 to about 1.5 grams/ml. The carbohydrate also exerts a small effect in reducing the $a_w$.

The electrolyte in the fractionation solution performs a two-fold function. First, it tends to lessen the viscosity of a carbohydrate/water solution to a small extent, thereby helping keep the viscosity of the solution in a more convenient range for handling; second, it reduces the water activity of the solution thereby greatly facilitating the separation. Applicants have discovered that high water activity has a detrimental effect on protein separations involving plant material. Unless the water activity is kept lower than about 0.9, where lipid-containing seed materials are used, both the protein granules and the seed residues hydrate and swell, and, as a result the densities of the protein granules and the seed residues approach one another. It is preferred to keep the $a_w$ in the range of about 0.85 to about 0.5 and it is most preferred in the range from about 0.5 to about 0.8. If hydration is allowed to occur and the densities of all materials in the liquid become too close, a separation based on density will be difficult to achieve. By maintaining the water activity within the range specified herein, hydration is reduced, the density difference between the protein granules and the seed residue is maintained, and the separation can be achieved to yield high quality protein.

Still another benefit of the low water activity required for the separation is the inhibition of bacterial growth; something of an antimicrobial effect is achieved.

Food or feed-approved antibacterial, anti-fungal, and antioxidant agents can be added to the aqueous solution of the electrolyte and carbohydrate without deleterious effect. In fact, these additives are preferred when the density fractionation process is operated at or above room temperature for several hours.

At certain concentrations of electrolyte and carbohydrate, the solution may become inconveniently viscous, either from suspended comminuted seed material or from extraction and dissolution of the sugars naturally present in the vegetable seed material. For ease in handling the solution, it is preferred to maintain a viscosity of from about 1 centipoise to about 300 centipoise; a viscosity of from about 1 centipoise to about 100 centipoise is most preferred.

In a typical procedure, the comminuted, lipid-containing vegetable seed matter is suspended, through intimate mixing, with the aqueous solution of electrolyte and carbohydrate. Any conventional mode of mixing can be used. High shear mixing is preferred, but simple stirring is also an acceptable mode.

A vegetable seed material to solution ratio of about 1:4 to about 1:100 (parts by weight) is acceptable for use in this process. Preferred for use herein is an oleaginous seed to solution ratio of about 1:5 to about 1:20 (parts by weight).

The contact time between the carbohydrate/electrolyte/water solution and the protein granules, as well as the temperature, affects the yield and the amount of protein recovered.

Generally from about 20 minutes to 15 hours of mixing time is sufficient. The time of mixing depends both upon the temperature of the solution and the type of mixing used. Simple magnetic stirring at 25° C. requires about 1-2 hours. High shear mixing using a higher temperature, 50° C., requires less time.

The temperature at which the mixing occurs and at which the density fractionation is accomplished can be from about 0° C. to about 120° C., preferably from about 5° C. to about 70° C., and most preferably from about 15° C. to about 50° C. The higher the temperature, the less viscous the solution, and thus the easier to handle. However, as the temperature is increased, the rate of hydration of the protein and seed residues increases even in the $a_w$ ranges specified herein. The rate of denaturation of the protein increases with temperature; thus, it is desirable to use temperatures of less than about 70° C.

After mixing, the protein granules are separated from the vegetable seed material/water/electrolyte/carbohydrate mixture, preferably by centrifugation. The upper layer contains 60% to 90% of the protein (as granules) present in the starting vegetable material as well as the lipid. The middle layer consists of water-/electrolyte/carbohydrate solution, which also contains water-soluble salts and sugars present in the vegetable seed material and a minor amount of protein. The bottom layer is primarily composed of the insoluble cellulosic and insoluble carbohydrate materials that make up the seed walls and other portions of the seed; however, a minor amount of protein may also be present in this layer.

The top, protein granule/lipid layer is physically separated from the two remaining layers. The protein recovery in this layer is about 70-80% of the protein present in the original vegetable seed material. The remaining protein is found either in the aqueous solution or still associated with the insoluble carbohydrates. The aqueous electrolyte/carbohydrate solution can be recycled. The protein granules can be defatted to remove the lipid by any conventional means to obtain a high quality protein, for example by solvent extraction with hexane and filtration.

In a preferred mode, the present invention also encompasses a process which comprises the suspension of comminuted, lipid-containing seed material in the three-component aqueous solution as described; the isolation of the protein granules from the vegetable seed residue; defatting the protein granules as described; and, as a final optional step, a concentration/extraction treatment which selectively extracts residual, non-proteinaceous components from the protein granules and further concentrates the protein.

For example, extraction of the protein granules with one of the following water-alcohol systems provides high quality protein. The solvent extraction further concentrates the protein by dissolving and carrying away any residual non-proteinaceous components, principally extraneous carbohydrates. The alcohols suitable for practicing this optional concentration/extraction step include the lower molecular weight alcohols, such as methanol, ethanol, 1-propanol, 2-propanol, and the butanols. The most preferred alcohol is ethanol, for both organoleptic and safety reasons.

The preferred water-alcohol solvent mixture is from about 50 parts by weight to about 90 parts by weight alcohol, the balance being water. The most preferred water-alcohol system is from about 50 parts to about 70 parts ethanol and from about 30 to about 50 parts water (by weight).

The optional concentration/extraction step can be conducted in a temperature range encompassing room temperature, i.e., from about 20° C. to about 60° C. However, the range from about 20° C. to about 30° C. is preferred.

Final desolventizing of the protein granules, whether or not the optional concentration/extraction step is performed, is not critical and can be achieved by conventional means such as free draining or centrifugation followed by forced air drying, filtration followed by drying, etc. The preferred methods are forced air drying of drained flakes at a temperature of from about 40° C. to about 90° C. and steam desolventizing.

| Best Mode of Carrying Out the Invention | |
|---|---|
| Liquid System | Parts by Weight |
| Sucrose | 44 |
| Sodium chloride | 16 |
| Water | 40 |

The ternary solvent system of sucrose, sodium chloride, and water has the density of 1.35 g/ml and an $a_w$ of 0.7. Fatted soy flour (500 g) having a particle size of between 1 and 100 microns is mixed with 5000 g of the liquid system and centrifuged for 45 minutes at room temperature and 2500 g. Two semi-solid layers separated by a liquid layer are produced.

The upper layer is separated, defatted using a hexane solvent extraction, and washed with 40% water/60% ethanol at 20° C. to remove any residual soluble solvent components and then air dried. This layer is the high protein layer and contains about 85% protein on a dry basis. This represents a yield of about 80% of the protein present in the defatted soy flour.

The bottom solid layer is also washed with 40% water/60% ethanol. It contains about 30% protein on a dry basis along with the insoluble carbohydrate and cellulosic materials.

Substantially the same results are obtained when the sodium chloride is replaced by an equivalent amount of potassium chloride.

When the soybean flour is replaced by a soybean meal or soybean concentrate, similar results are obtained.

When the soybean flour is replaced by peanut flour, cottonseed meal, or peanut concentrate, similar results are obtained.

When the density separated soy protein is supplemented with a nutritionally-supplemental amount of N-acetyl-L-methionine or its derivatives, in the manner disclosed in U.S. Pat. Nos. 3,878,305 and 3,952,115, incorporated herein by reference, a product having a protein efficiency ration (PER) similar to ground beef (3.0) results. Commercial isolates supplemented with equivalent amounts of N-acetyl-L-methionine have a lower PER (about 2.5).

INDUSTRIAL APPLICABILITY

Example I

| Liquid System (Density 1.33) | Parts by Weight |
|---|---|
| Sucrose | 38.1 |
| Sodium chloride | 18.4 |
| Water | 43.5 |
| Liquid System (Density 1.34) | Parts by Weight |
| Sucrose | 41 |
| Sodium chloride | 16.5 |

| -continued | |
|---|---|
| Water | 42.5 |

Soybeans are ground for four hours in a vibratory energy mill (Sweco ®) to produce a flour having an average particle size of less than 80 microns. This flour is mixed with one of the liquid systems above in a ratio of 1 part flour to 15 parts of liquid system.

These mixtures are centrifuged at 5000 g and a temperature of about 10° to 15° C.

In both cases, i.e., when the density of the fluid is 1.33 and 1.34, three semi-solid layers are formed; a packed layer on top, followed by a liquid layer, a mushy semi-solid layer, and a lower packed layer.

The topmost packed layer is separated, defatted by hexane extraction, desugared by an ethanol/water wash, and the protein content measured. When the density of the liquid system is 1.33, the upper layer will contain about 90% protein on a dry basis which represents about 60% of the protein in the starting soy flour.

When the density of the liquid system is 1.34, the upper layer contains about 95% protein on a dry basis which also represents about 60% of the protein initially present in the soy flour.

When the sucrose is replaced by equivalent amounts of glucose or corn syrup solids to obtain the same densities as in Example I, similar results are obtained.

Example II

| Liquid System | Parts by Weight |
|---|---|
| Sucrose | 65 |
| Potassium chloride | 8 |
| Water | 27 |

The liquid system of sucrose, potassium chloride, and water had a density of about 1.40 and a water activity of about 0.7. Comminuted peanut flour (100 g), produced by freezing peanuts and then hammer milling them to a particle size less than about 150 microns, is mixed with the liquid system (1000 g) and centrifuged at 4000 g for about 20 minutes at 30° C. Two solid layers separated by a liquid layer are produced.

The upper, protein granule containing layer is separated, defatted, and washed with an alcohol/water solution containing about 50 parts alcohol and 50 parts water. The protein thus isolated is then separated from the water-alcohol solution and air dried at about 60° C. The resulting product is a peanut protein which is substantially undenatured.

Similar results are achieved when cottonseed flour is used in place of peanut flour.

The high quality protein products prepared in the manner of Examples I and II can be used as food supplements for humans or lower animals. These protein products can also be texturized by various well-known means to provide meat analogs in the form of "vegetable-based" ground beef analogs, vegetable-based ground beef patties, vegetable-based sausage, vegetable-based meat or cheese type spreads, and the like.

What is claimed is:

1. A process for recovering vegetable seed protein granules from vegetable seed material, comprising suspending comminuted vegetable seed material having from about 10% to about 70% lipid and containing protein granules in an aqueous solution comprising an electrolyte selected from the group consisting of alkali metal halides and alkali metal phosphates, at a concentration greater than about 1%, and a carbohydrate, at a concentration greater than about 1%, said aqueous solution having a density of from about 1.1 to about 1.5 and a water activity of less than about 0.9, and, isolating the vegetable seed protein granules from the balance of the vegetable seed material.

2. A process according to claim 1 wherein said solution has a density of from about 1.20 to about 1.50.

3. A process according to claim 1 wherein said aqueous solution has a water activity of 0.85 or less.

4. A process according to claim 3 wherein said aqueous solution has a density of from about 1.25 to about 1.50.

5. A process according to claim 4 wherein the water activity of said aqueous solution is from about 0.5 to about 0.8.

6. A process according to claim 5 wherein the viscosity of said aqueous solution is from about 1 to about 300 centipoise.

7. A process according to claim 1 wherein said electrolyte is selected from the group of alkali metal halides and alkali metal phosphates.

8. A process according to claim 7 wherein said electrolyte is an alkali metal halide selected from sodium chloride and potassium chloride.

9. A process according to claim 1 wherein said carbohydrate is selected from the group of monosaccharides, disaccharides, trisaccharides, low molecular polysaccharides, or mixtures thereof.

10. A process according to claim 9 wherein said carbohydrate is selected from glucose, sucrose, and corn syrup solids.

11. A process according to claim 1 wherein said vegetable seed material is an oleaginous seed selected from the group consisting of soybeans, cottonseed, sunflower seed, peanuts, copra, and rapeseed.

12. A process according to claim 11 wherein said vegetable seed material is selected from soybean meal, flour, or concentrate and cottonseed meal, flour, or concentrate.

13. A process according to claim 12 wherein said electrolyte is sodium chloride or potassium chloride and said carbohydrate is sucrose, glucose, or corn syrup.

14. A process for recovering vegetable seed protein granules from vegetable seed material having from 10% to about 70% lipid and containing protein granules, comprising:
(1) comminuting said vegetable seed material;
(2) suspending said vegetable seed material in an aqueous solution comprising an electrolyte selected from the group consisting of alkali metal halides and alkali metal phosphates at a concentration greater than about 1%, and a carbohydrate at a concentration greater than about 1%, said solution having a density of from about 1.1 to about 1.5 and a water activity of less than 0.90;
(3) isolating said protein granules from the balance of the vegetable seed materials;
(4) defatting the vegetable seed protein granules; and
(5) washing said protein granules with a water/alcohol solvent mixture.

15. A process according to claim 14 wherein said vegetable seed material is selected from soybeans, cottonseed, sunflower seeds, peanuts, rapeseed, and copra.

16. A process according to claim 15 wherein said vegetable seed material is defatted soybean meal, flour or concentrate.

17. A process according to claim 14 wherein said water/alcohol solvent mixture contains from about 50 parts to about 70 parts of alcohol selected from methanol, ethanol, 1-propanol, 2-propanol, and butanol.

18. A process according to claim 17 wherein said alcohol is ethanol.

19. A process according to claim 18 wherein said electrolyte is sodium chloride or potassium chloride and said carbohydrate is sucrose or corn syrup.

* * * * *